United States Patent
Inturi et al.

(10) Patent No.: US 11,036,713 B2
(45) Date of Patent: Jun. 15, 2021

(54) SENDING NOTIFICATIONS IN A MULTI-CLIENT DATABASE ENVIRONMENT

(71) Applicant: INTERNATIONAL BUSINESS MACHINES CORPORATION, Armonk, NY (US)

(72) Inventors: Nagaraju Inturi, Overland Park, KS (US); Shawn D. Moe, Leavenworth, KS (US); Pradeep Natarajan, Eudora, KS (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 16/022,818

(22) Filed: Jun. 29, 2018

(65) Prior Publication Data

US 2020/0004854 A1   Jan. 2, 2020

(51) Int. Cl.
*G06F 16/00* (2019.01)
*G06F 7/00* (2006.01)
*G06F 16/23* (2019.01)
*G06F 21/64* (2013.01)
*G06F 16/21* (2019.01)

(52) U.S. Cl.
CPC .......... *G06F 16/2358* (2019.01); *G06F 16/21* (2019.01); *G06F 16/2379* (2019.01); *G06F 21/64* (2013.01)

(58) Field of Classification Search
CPC .. G06F 16/2358; G06F 16/21; G06F 16/2379; G06F 21/64
USPC ........................................................ 707/609
See application file for complete search history.

(56) References Cited

U.S. PATENT DOCUMENTS

| | | | |
|---|---|---|---|
| 7,089,265 B1 * | 8/2006 | Jain ..................... | G06F 16/2358 707/611 |
| 9,654,576 B2 | 5/2017 | Jolfaei | |
| 2009/0158298 A1 * | 6/2009 | Saxena ............... | G06F 16/2358 719/318 |

(Continued)

FOREIGN PATENT DOCUMENTS

WO    2017161417    9/2017

OTHER PUBLICATIONS

Hull, Richard; Blockchain: Distributed Event-based Processing in a Data-Centric World; ACM International Conference on Distributed and Event-based Systems; Jun. 22, 2017; 3 pages.

(Continued)

*Primary Examiner* — Raquel Perez-Arroyo
(74) *Attorney, Agent, or Firm* — Schmeiser, Olsen & Watts; Stephanie Carusillo

(57) ABSTRACT

An approach is provided for sending a notification of change(s) in a database in a multi-client database environment. Event data in a database satisfying criteria is identified by examining a log that is updated after the event data is committed in the database. The criteria indicate change(s) in data in the database. The event data is grouped into data sets specified by subscriptions of client computer(s) in the multi-client database environment. The grouped event data is pushed to the client computer(s) for consumption by application(s) being executed by the client computer(s), respectively. A notification is sent to the client computer(s) of the change(s) to the data in the database.

20 Claims, 3 Drawing Sheets

(56) References Cited

U.S. PATENT DOCUMENTS

| | | | |
|---|---|---|---|
| 2010/0332448 A1* | 12/2010 | Holenstein | G06F 16/273 |
| | | | 707/615 |
| 2012/0079082 A1 | 3/2012 | Ding et al. | |
| 2017/0046651 A1 | 2/2017 | Lin et al. | |
| 2017/0161288 A1* | 6/2017 | Feldman | G06F 16/13 |
| 2017/0287090 A1 | 10/2017 | Hunn et al. | |
| 2017/0293619 A1* | 10/2017 | Dubey | G06F 16/211 |
| 2017/0322946 A1* | 11/2017 | Mashinsky | G06Q 30/0256 |
| 2019/0205121 A1* | 7/2019 | Ericson | H04L 9/0643 |

OTHER PUBLICATIONS

Weber, Ingo et al.; Untrusted Business Process Monitoring and Execution Using Blockchain; In: La Rosa M., Loos P., Pastor O. (eds) Business Process Management. BPM 2016. Lecture Notes in Computer Science, vol. 9850. Springer, Cham.

Salem, Rashed et al.; Active XML-based Web data integration; Inf Syst Front (2013) 15: 371; https://doi.org/10.1007/s10796-012-9405-6; 25 pages.

Morgan, Dan; Oracle Streams and Change Data Capture (CDC) 10gR2; University of Washington; https://www.morganslibrary.org/pres/ukoug/ukoug06_cdc.pdf; 66 pages.

Creating a trigger that is executed only after table insert has been committed; https://searchoracle.techtarget.com/answer/Creating-a-trigger-that-is-executed-only-after-table-insert-has-been-committed; Aug. 2002; 3 pages.

* cited by examiner

SENDING NOTIFICATIONS IN A MULTI-CLIENT DATABASE ENVIRONMENT

BACKGROUND

The present invention relates to detecting database changes in near real-time, and more particularly to notifying client applications of database changes by using a push-based approach.

In a relational database environment, client applications poll for required data and then trigger other complex job execution based on changes that have been posted to the database. The aforementioned polling approach includes notifying other components in a complex micro-service-based enterprise application (e.g., alerting the fraud department based on certain event conditions, or executing a smart contract in a blockchain). In scenarios in which user applications are managing a blockchain smart contract, the smart contracts need to be created or updated as data is entered, deleted, or modified in the database. Systems of record or traditional relational database management systems are generally the source of data for blockchain smart contracts.

SUMMARY

In one embodiment, the present invention provides a method of sending a notification of one or more changes in a database in a multi-client database environment. The method includes a computer identifying event data in a database satisfying criteria by examining a log that is updated after the event data is committed in the database. The criteria indicate one or more changes in data in the database. The method further includes in response to identifying the event data satisfying the criteria, the computer grouping the event data into data sets specified by subscriptions of one or more client computers in the multi-client database environment. The method further includes the computer pushing the grouped event data to the one or more client computers for consumption by one or more applications being executed by the one or more client computers, respectively. The method further includes in response to the step of pushing, the computer sending a notification to the one or more client computers of the one or more changes to the data in the database.

In another embodiment, the present invention provides a computer program product for sending a notification of one or more changes in a database in a multi-client database environment. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system identifying event data in a database satisfying criteria by examining a log that is updated after the event data is committed in the database. The criteria indicate one or more changes in data in the database. The method further includes in response to identifying the event data satisfying the criteria, the computer system grouping the event data into data sets specified by subscriptions of one or more client computers in the multi-client database environment. The method further includes the computer system pushing the grouped event data to the one or more client computers for consumption by one or more applications being executed by the one or more client computers, respectively. The method further includes in response to the step of pushing, the computer system sending a notification to the one or more client computers of the one or more changes to the data in the database.

In another embodiment, the present invention provides a computer system including a central processing unit (CPU); a memory coupled to the CPU; and a computer readable storage device coupled to the CPU. The storage device includes instructions that are executed by the CPU via the memory to implement a method of sending a notification of one or more changes in a database in a multi-client database environment. The method includes the computer system identifying event data in a database satisfying criteria by examining a log that is updated after the event data is committed in the database. The criteria indicate one or more changes in data in the database. The method further includes in response to identifying the event data satisfying the criteria, the computer system grouping the event data into data sets specified by subscriptions of one or more client computers in the multi-client database environment. The method further includes the computer system pushing the grouped event data to the one or more client computers for consumption by one or more applications being executed by the one or more client computers, respectively. The method further includes in response to the step of pushing, the computer system sending a notification to the one or more client computers of the one or more changes to the data in the database.

DETAILED DESCRIPTION

Overview

Figure 1:
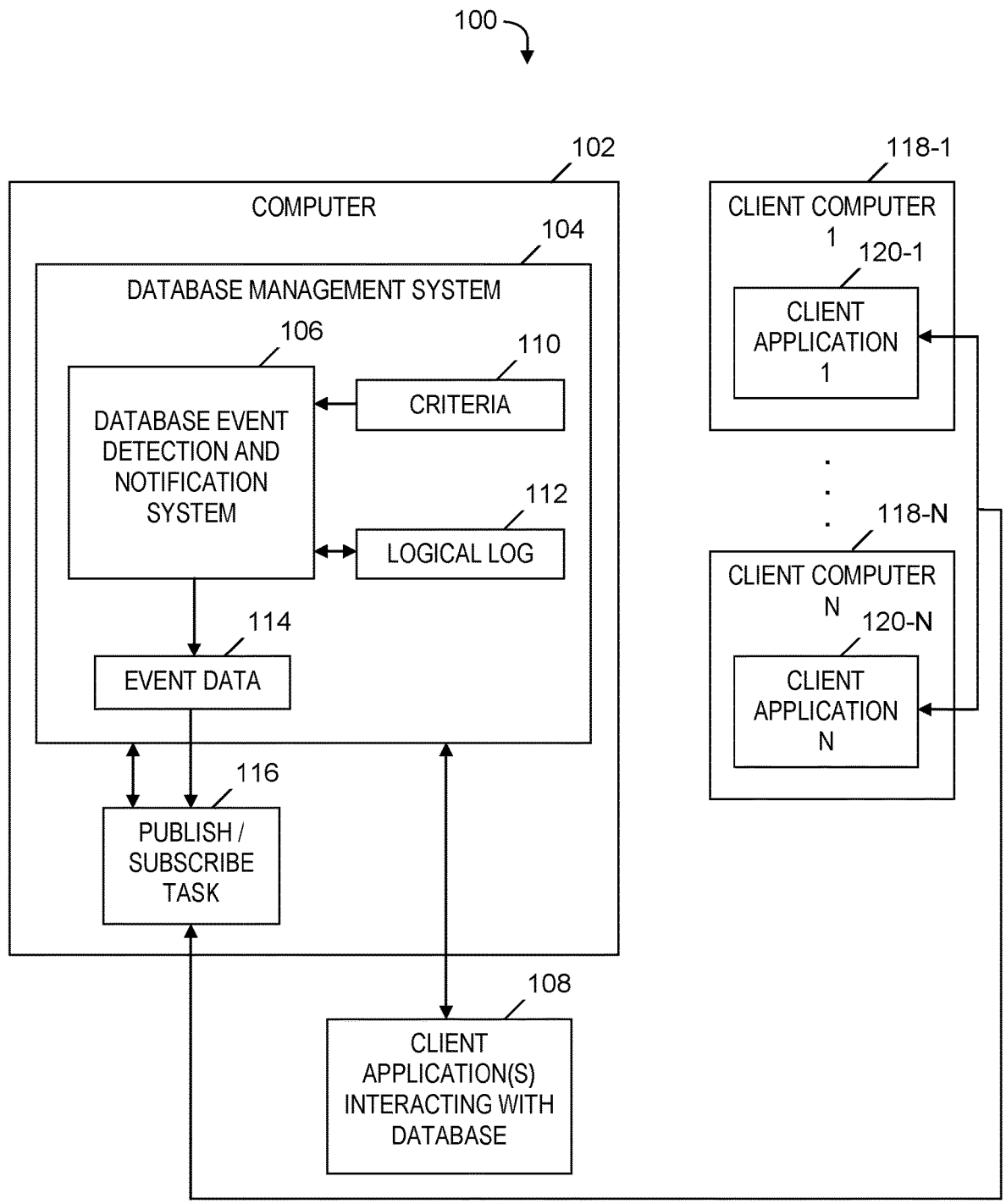
FIG. 1 is a block diagram of a system for sending notifications of database changes in a multi-client database environment, in accordance with embodiments of the present invention.

Embodiments of the present invention provide client applications with near real-time notification of changes in a database server along with what data has been changed, without requiring a polling of a database for data changes. Embodiments of the present invention provide the notification of the database changes without increasing the overhead of traditional online transaction processing (OLTP) applications that are creating and modifying data in the database server. Embodiments of the present invention provide a technique for detecting and notifying about the changes in the database server that scales linearly as additional real-time applications are added to the database server. Embodiments of the present invention provide a single source of data while avoiding multiple copies of data that can be out of sync, thereby allowing blockchain smart contracts to be updated with a single source of data.

The polling mechanisms that are currently utilized in database applications to look for data changes in the database add significant administration overhead and/or hardware cost to the database, and add significant latency for detecting changes in the database. Furthermore, known polling design approaches do not scale linearly as real-time applications are added to a database server. Other known approaches including streaming all changes from a database layer back to an application layer, sharding data across multiple commodity hardware, and separating read and write activities on two different database servers also have the aforementioned overhead, cost, and/or latency disadvantages. Furthermore, known techniques to notify the application of database changes have drawbacks when reporting the changes. Conventional database triggers, for example, can be configured to be fired when certain conditions are processed by the database, but triggers operate on all data, not necessarily only on the data which has been committed to the database. Database triggers also have global scope (i.e., the triggers impact all client applications, all database sessions, and all changes processed by the database). In known techniques, client applications can be custom written to examine only committed data, but these must be initiated either by some event (database trigger), or more likely a clock cycle. Known clock-based querying potentially wastes processing cycles when there is no data matching the application's criteria. Applications that run less frequently use fewer resources, but there is a delay in recognizing new data that needs processing. Applications that run more frequently will identify new data quicker, but will use more machine resources to check for the existence of the data. In scenarios in which user applications are managing a blockchain smart contract, the smart contracts need to be created or updated as data is entered, deleted, or modified in a database. The known periodic querying (i.e., polling) of the database to determine whether a smart contract needs to be updated is very inefficient because it experiences significant cost and overhead disadvantages.

The aforementioned known techniques provide unique challenges in detecting and sending notifications about database events. These unique challenges are overcome by embodiments of the present invention that provide an improved, smarter trigger for near real-time detection and notification of events happening in a database for applications in complex real-time application environments and micro-service based architectures, without adding significant overhead, cost, and latency to the database. The overhead of SQL processing, such as parsing, building a query plan, optimizing the query plan, executing the query, handling locking conflicts, etc., is avoided by embodiments disclosed herein, while still allowing client applications to use a SQL query, including a WHERE clause filter, to obtain the data in which they are interested.

In one or more embodiments, the near real-time detection and notification of database events is provided to applications that require strong transactional support and atomicity, consistency, isolation, and durability (ACID) database properties. In one or more embodiments, the near real-time detection and notification of database events utilizes a push-based design and guarantees that the data has been committed to the database, without requiring that all the data flow through the same middleware service, and thereby avoiding middleware overhead and avoiding the need for middleware componentry.

In one or more embodiments, the near real-time detection and notification of database events does not use known SQL triggers, is asynchronous and is not required to be global in scope. In one or more embodiments, the near real-time detection and notification of database events is dynamically enabled and disabled and limited to specified time frames, users, sessions, and/or conditions. In one or more embodiments, the near real-time detection and notification of database events includes a notification in response to specific data in a database having been changed, which is different from a known SQL trigger that provides a notification in response to any data (i.e., data that has not been specified) having been changed.

System for Sending Notifications in a Multi-Client Database Environment

FIG. 1 is a block diagram of a system 100 for sending notifications of database changes in a multi-client database environment, in accordance with embodiments of the present invention. System 100 includes a computer 102, which executes a software-based database management system (DBMS) 104, which includes a software-based database event detection and notification system 106. In one embodiment, computer 102 is a database server computer. In one embodiment, DBMS 104 is a relational database management system. In one embodiment, DBMS 104 is an operational database management system.

Client application(s) 108 (e.g., OLTP application(s)) interact with a database (not shown) managed by DBMS 104 via a computer network (not shown), which includes making changes to data in the database. Client application(s) 108 are executed by one or more computers (not shown).

Criteria 110 (i.e., push data selection criteria) indicate conditions by which event data (i.e., changed data) in the database causes a notification of the criteria being satisfied and the changed data to be pushed to client applications that have registered an interest in (i.e., subscribed to) a data set that specifies the event data. In one embodiment, specifications of data sets of interest to different client applications are stored as JavaScript® Object Notation (JSON) documents or in relational database tables. JavaScript is a registered trademark owned by Oracle America, Inc. located in Redwood Shores, Calif. In one embodiment, a client application registers the aforementioned interest in the data set by making an application programming interface (API) call to specify the database and table, along with a specific SQL SELECT statement that identifies the desired data. In one embodiment, the client application also specifies an application-supplied label to be returned to the application in response to criteria 110 being satisfied and the event data is prepared to be pushed to the client application. In one embodiment, criteria 110 indicate types of transactions that are of interest to client applications that have registered an interest in data changed by a transaction whose type is one of the aforementioned types of transactions.

Database event detection and notification system 106 examines a logical log 112 to identify event data in the database that satisfies criteria 110. In one embodiment, DBMS 104 updates logical log 112 as part of a process of committing a transaction.

Database event detection and notification system 106 groups the identified event data into grouped event data 114 and sends grouped event data 114 to a software-based publish/subscribe task 116. Computer 102 is in communication with client computers 118-1, . . . , 118-N via a computer network (not shown), where N is an integer greater than or equal to one. Client computers 118-1, . . . , 118-N execute software-based client applications 120-1, . . . , 120-N, respectively. Publish/subscribe task 116 pushes grouped event data 114 to client applications 120-1, . . . , 120-N that have subscribed to data sets specifying event data 114.

Via the pushing of grouped event data 114, database event detection and notification system 106 automatically and in near real-time sends grouped event data 114, notifications of criteria 110 being satisfied, and notifications of changes in the database to client applications 120-1, ..., 120-N, without the client applications polling for changes in the database.

In one embodiment, client applications 120-1, ..., 120-N are different applications. In another embodiment, some or all of client applications 120-1, ..., 120-N are the same application.

Figure 2:
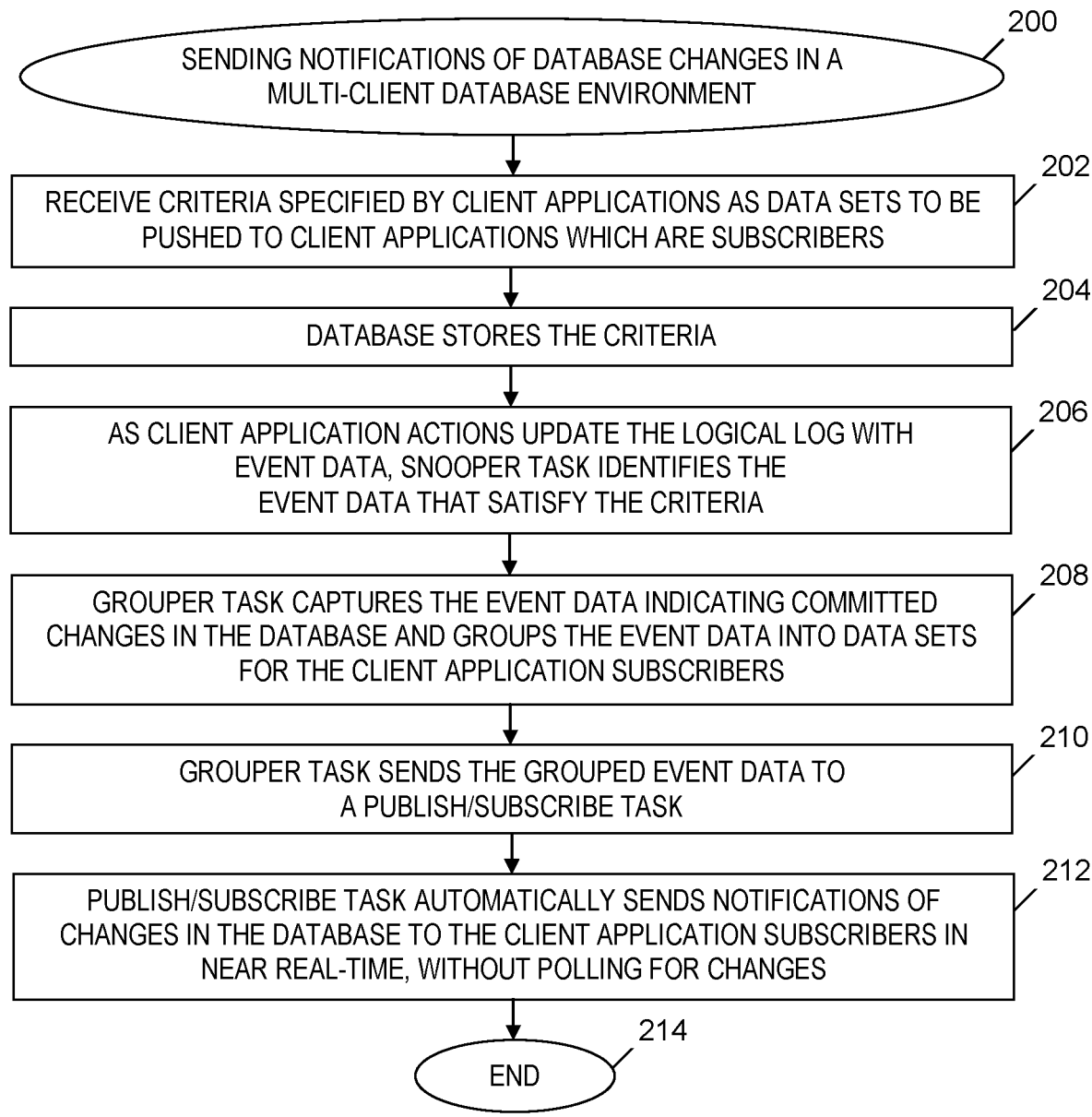
FIG. 2 is a flowchart of a process of sending notifications of database changes in a multi-client database environment, where the process is implemented in the system of FIG. 1, in accordance with embodiments of the present invention.
Figure 3:
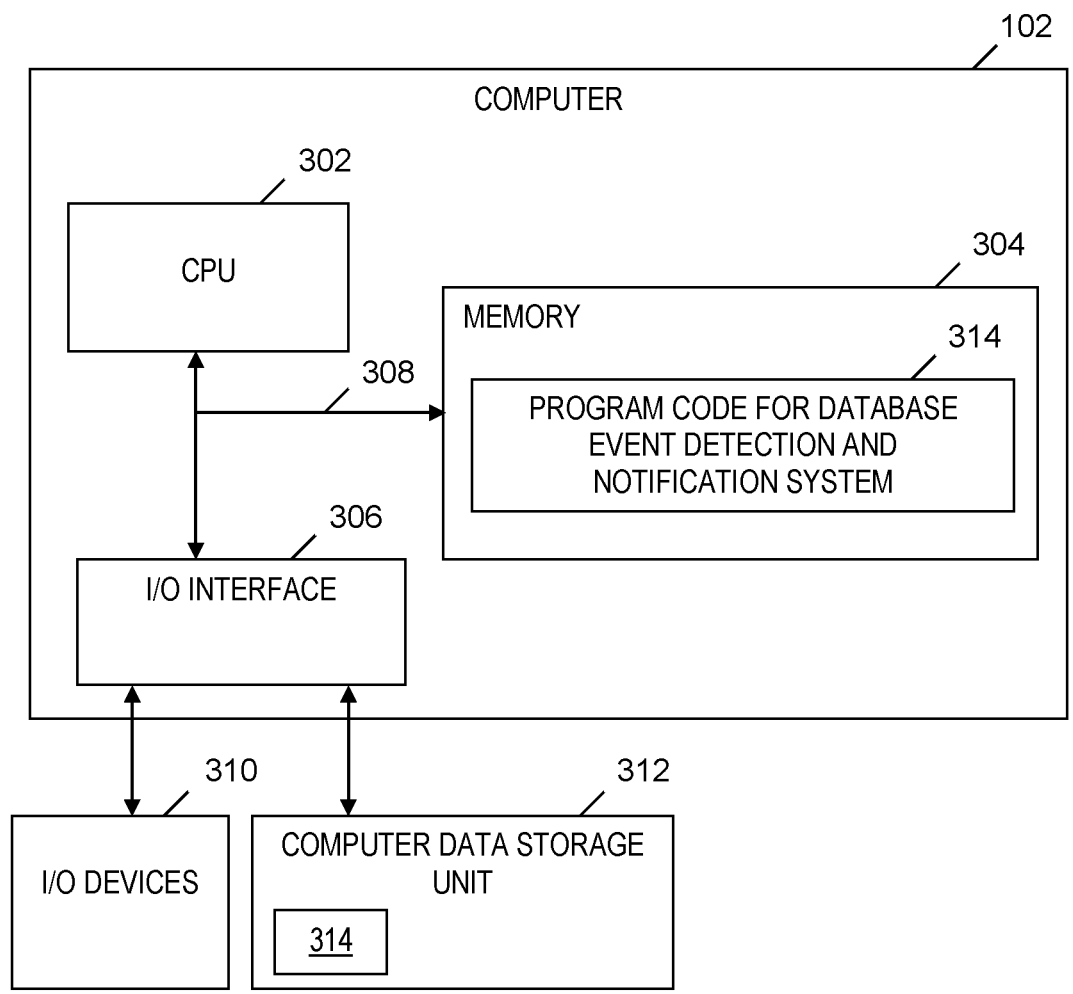
FIG. 3 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Sending Notifications in a Multi-Client Database Environment

FIG. 2 is a flowchart of a process of sending notifications of database changes in a multi-client database environment, where the process is implemented in the system of FIG. 1, in accordance with embodiments of the present invention. The process of FIG. 2 starts at step 200. Prior to step 202, client application(s) specify criteria 110 (see FIG. 1) indicating change(s) in data in a database being managed by DBMS 104 (see FIG. 1). In one embodiment, the client applications specify criteria 110 (see FIG. 1) by subscribing to data sets using a SQL SELECT statement along with a column projection list and a WHERE clause, where the subscribing is performed via a simple user interface. For example, a developer utilizes a user interface to specify an interest in credit card transactions that exceed $10,000, using the system function "task" presented below, which identifies the credit card transactions within the creditcardtxns table in the creditdb database:

```
EXECUTE FUNCTION informix.task (
  'pushdata register', table: "creditcardtxns",
  owner : "informix", database: "creditdb",
  selectstmt:
    "SELECT uid, cardid, carddata
    FROM creditcardtxns
    WHERE carddata.Amount::int >= 10000",
  label: "card txn alert"}
)
```

The SELECT statement in the function presented above includes the projection list (uid, cardid, carddata) and the WHERE condition of carddata.Amount::int>=10000. The function presented above also specifies a label of "card txn alert" to be returned with the data set.

In step 202, database event detection and notification system 106 (see FIG. 1) receives criteria 110 (see FIG. 1) specified by the client application(s)), where the criteria 110 (see FIG. 1) specifies data sets to be pushed to the subscriber client application(s) 120-1, ..., 120-N (see FIG. 1).

In step 204, database event detection and notification system 106 (see FIG. 1) stores criteria 110 (see FIG. 1) for persistence.

Client application(s) 108 (see FIG. 1) perform actions on data in the database which updates logical log 112 (see FIG. 1) to indicate event data. Logical log 112 (see FIG. 1) is required by system 100 to support ACID properties of DBMS 104 (see FIG. 1). In step 206, as actions by client application(s) 108 update logical log 112 (see FIG. 1), a snooper task executed by database event detection and notification system 106 (see FIG. 1) examines logical log 112 (see FIG. 1) and identifies event data in the database that satisfies criteria 110 (see FIG. 1). In one embodiment, the snooper task is an asynchronous thread or process.

In step 208, in response to the event data being identified that satisfies criteria 110 (see FIG. 1) in step 206, database event detection and notification system 106 (see FIG. 1) executes a grouper task (i.e., a process or thread), which captures the event data which are committed changes to the database, filters out the event data that are not committed changes to the database, and groups the captured event data into grouped event data 114 for the subscribed client(s) (i.e., client application(s) 120-1, ..., 120-N (see FIG. 1)).

In step 210, the grouper task sends the grouped event data 114 (see FIG. 1) to publish/subscribe task 116 (see FIG. 1).

In step 212, publish/subscribe task 116 (see FIG. 1) automatically and in near real-time pushes grouped event data 114 (see FIG. 1) and notifications of criteria 110 (see FIG. 1) being satisfied and changes to data in the database to the client applications 120-1, ..., 120-N (see FIG. 1) (i.e., push-data clients), without a polling of changes in data in the database. In one embodiment, publish/subscribe task 116 (see FIG. 1) uses the Message Queuing Telemetry Transport (MQTT) messaging protocol to push grouped event data 114 (see FIG. 1) to client applications 120-1, ..., 120-N (see FIG. 1). In one embodiment, client applications 120-1, ..., 120-N (see FIG. 1) receive the pushed event data 114 (see FIG. 1), which is committed data in a JSON format.

Following step 212, the process of FIG. 2 ends at step 214.

In one embodiment, in response to criteria 110 (see FIG. 1) being satisfied by event data 114 (see FIG. 1) committed in the database, database event detection and notification system 106 (see FIG. 1) returns event data 114 (see FIG. 1) to client applications 120-1, ..., 120-N (see FIG. 1) in JSON format. Extending the example presented in the system function "task" presented above, database event detection and notification system 106 (see FIG. 1) pushes a JSON document to client application 120-1 (see FIG. 1), where the JSON document is presented below:

```
{
  operation: "INSERT",
  table: "creditcardtxns",
  owner: "informix",
  database: "creditdb",
  label: "card txn alert",
  txn_id : "5290036089452371,
  commit_time: 1487780963,
  op_num: 1,
  rowdata: {
    uid: "6",
    cardid: "6666-6666-6666-6666",
    carddata: {
      "Merchant": ACME, Inc.",
      "Amount": 10010,
      "Date": "25-Jan-2018 16:15"
    }
  }
}
```

Database event detection and notification system 106 (see FIG. 1) returns the label, a first image of data in a table in the database before the data is committed, and a second image of committed row data indicated in the JSON document example presented above, along with other metadata about the specific row in the table. By returning both the first image (before commit image) and the second image (after commit image) of the row, the client/requester knows exactly what data changed within the row. If the client application 120-1 (see FIG. 1) is maintaining a blockchain smart contract, the data in the JSON document is used to update the blockchain with no further database interaction required.

In one embodiment, the technique described in the examples presented above is supported with a parallel architecture provided by the grouper task in the database server (i.e., computer 102 (see FIG. 1)), which captures changes in the database, evaluates the changes against criteria 110 (see FIG. 1), and subsequently regroups transaction data for the subscribed data set and pushes the data out for client applications 120-1, . . . , 120-N (see FIG. 1) to consume. Again, system 100 in FIG. 1 and the process of FIG. 2 provide a design that scales linearly irrespective of the number of client applications subscribed to data changes. Linear scaling is achieved by having the client applications 120-1, . . . , 120-N (see FIG. 1) perform minimal work with the database server.

In one embodiment, client application 120-1 (see FIG. 1) specifies a time interval during which criteria 110 (see FIG. 1) is to be evaluated. For example, database event detection and notification system 106 (see FIG. 1) sends event data 114 (see FIG. 1) to a blockchain smart contract maintenance service only during the specified time interval.

In another embodiment, database event detection and notification system 106 (see FIG. 1) evaluates data events against criteria 110 (see FIG. 1) which is limited or restricted to specified database sessions or specified users.

In one embodiment, client application 120-1 (see FIG. 1) follows an event-based programming model and in response to receiving the change in subscribed data as a result of step 212, client application 120-1 (see FIG. 1) invokes a blockchain smart contract execution.

In one example, a client application (e.g., client application 120-1 in FIG. 1) maintains a blockchain smart contract that addresses large cash transactions for Corporation XYZ. For contractual reasons, XYZ is required to post transactions in excess of $10,000 to a blockchain. The client application creates a JSON document describing the types of transactions of interest to the client application, and uses an API function of the database to register the interest. In step 204, the database stores the JSON document within its structures and updates the in-memory structures used by the snooper task. The client application subscribes to the MQTT topic, where the data is to be pushed from the database. Other applications, such as XYZ's point of sale system, are continuously updating the database as purchases are being made. In step 206, a transaction is executed from one of the other applications and in response, the snooper task recognizes that the transaction exceeds a $10,000 threshold by examining an update to logical log 112 (see FIG. 1). In step 208, the snooper task engages the grouper task to gather the specified data associated with the registered interest of the client application, generates the label, and formats a response. In step 210, the grouper task publishes event data 114 (see FIG. 1) to the specified MQTT topic. The client application receives the pushed data from MQTT. The client application updates the blockchain smart contract with the details of the transaction that exceeds the $10,000 threshold.

Snooper Task

In one embodiment, the snooper task that performs step 206 is a thread that reads log records from either the log buffer cache or from logs on disk. Subsequently, database event detection and notification system 106 (see FIG. 1) copies the log record information and row data into update buffers and places the log record information and row data onto a log record queue. A grouper fan-out thread component of a grouper task, which is described below, reads buffers from the log record queue.

Grouper Task

In one embodiment, the grouper task that performs steps 208 and 210 has two components: a grouper fan-out thread and a grouper evaluation thread. The grouper task (1) creates a grouper transaction structure for each new transaction it encounters; (2) creates a new grouper update structure for each log update; (3) groups transaction updates by attaching each grouper update structure to a grouper transaction according to a transaction identifier; (4) evaluates each record for each of the table's replicates; and (5) for committed transactions, builds JSON records for the rows qualified for the subscription criteria, copies the JSON records to subscribers session queue, and notifies the subscriber session.

The grouper task uses four main data structures for tracking transactions and their updates of logical log 112 (see FIG. 1): (1) global transaction list, (2) open transaction array, (3) serial transaction list, and (4) transaction update list. The grouper structure points to the global transaction and serial lists and the open transaction array, along with other grouper-related structures.

Grouper Transaction List:

In response to receiving a Begin Transaction (BEGTX) record, the grouper fan-out thread creates a new grouper transaction structure and places it on the global list. A transaction remains in this list until it is deleted from the queue or is spooled.

Open Transaction Array:

The open transaction array begins with a size of 1024 elements. Each array element can point to a grouper transaction structure, using the transaction identifier as an index to the array. The grouper fan-out thread expands the array size if the number of open transactions increases beyond the array size. In response to creating a new grouper transaction structure, the grouper fan-out thread stores a pointer to the new structure in the appropriate open transaction array offset. In response to receiving an End Transaction (ENDTX) update, which indicates all updates to the transaction have been processed, the grouper fan-out thread removes the transaction from the open transaction array.

Serial Transaction List:

In response to receiving an ENDTX record, the grouper fan-out thread places the record's transaction on the serial transaction list to ensure that transactions are queued in the same order in which they were committed. In the send phase, the grouper evaluation thread removes the transaction from the serial transaction list prior to queueing the transaction.

Transaction update list: The grouper fan-out thread allocates a new grouper update link structure for each log record that follows the BEGTX record and links the new grouper update link structure to the grouper transaction structure's transaction update list. The uplink structure contains information about the row being updated, such as partnum, row id, log id, logpos, and a pointer to the original log update structure.

The grouper fan-out thread performs the following jobs: (1) waits for new messages from the snooper task; (2) sets up a new grouper transaction structure for each BEGTX update and inserts the new transaction into the open transaction array; (3) creates a new grouper update link structure for each non-BEGTX log update buffer received from the snooper task; (4) for ENDTX records, zeros out the open transaction array entry and inserts the transaction into the serial transaction list; (5) adds each new uplink structure to its corresponding transaction list; and (6) passes each new uplink record to grouper evaluation threads.

The grouper evaluation threads receive work from the grouper fan-out thread. Each grouper evaluation thread has two distinct components: (1) evaluating and filtering log update records and (2) restructuring a grouper transaction into a JSON transaction, queueing the newly formed JSON transaction records to the subscriber's session queue, and notifying the subscriber.

Computer System

FIG. 3 is a block diagram of a computer 102 that is included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for a system that includes database event detection and notification system 106 (see FIG. 1) to perform a method of sending notifications of database changes in a multi-client database environment, where the instructions are executed by CPU 302 via memory 304. CPU 302 may include a single processing unit, or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer-readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to send notifications of database changes in a multi-client database environment. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to sending notifications of database changes in a multi-client database environment. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to send notifications of database changes in a multi-client database environment. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of sending notifications of database changes in a multi-client database environment.

While it is understood that program code 314 for sending notifications of database changes in a multi-client database environment may be deployed by manually loading directly in client, server and proxy computers (not shown) via loading a computer-readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of sending notifications of database changes in a multi-client database environment. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media)

(i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of sending a notification of one or more changes in a database in a multi-client database environment, the method comprising the steps of:
   a computer identifying event data in a database satisfying criteria by a snooper thread examining a log that is updated after the event data is committed in the database, the criteria indicating one or more changes in data in the database, the examining the log including the snooper thread reading records of the log from a log buffer cache and copying the records onto a log record queue;
   the computer reading, by a grouper fan-out thread, the records on the log record queue, wherein the reading the records includes reading Begin Transaction (BEGTX) records and reading End Transaction (ENDTX) records;
   the computer setting up, by the grouper fan-out thread, grouper transaction structures for respective BEGTX records included in the log record queue read by the grouper fan-out thread;
   in response to the reading the BEGTX records, the computer inserting, by the grouper fan-out thread, transactions indicated by the BEGTX records into an open transaction array, the transactions having respective identifiers that are indexes to the open transaction array, and the open transaction array having respective offsets that point to the grouper transaction structures;
   in response to the reading the ENDTX records, the computer removing, by the grouper fan-out thread, the respective transactions that had been inserted into the open transaction array and inserting the removed transactions into a serial transaction list so that the transactions in the serial transaction list are queued in an order matching an order in which the transactions in the serial transaction list were committed;
   the computer restructuring, by a grouper evaluation thread, the transactions in the serial transaction list to respective JSON transactions which are in a JSON format the computer queueing, by the grouper evaluation thread, the JSON transactions in respective one or more session queues of one or more client computers subscribed to a data set that specifies the event data;
   the computer pushing, by the grouper evaluation thread and using a Message Queuing Telemetry Transport messaging protocol, the JSON transactions to the one or more client computers for consumption by one or more applications being executed by the one or more client computers, respectively; and
   in response to the step of pushing, the computer sending, by the grouper evaluation thread, a notification to the one or more client computers of the one or more changes to the data in the database.

2. The method of claim 1, wherein the steps of identifying, reading, setting up, inserting the transactions indicated by the BEGTX records, removing, inserting the removed transactions into the serial transaction list, restructuring, queueing, pushing and sending provide a detection of events happening in the database that is passive and adds an amount of overhead to a system performing the steps of identifying, grouping, reading, setting up, inserting the transactions indicated by the BEGTX records, removing, inserting the removed transactions into the serial transaction list, restructuring, queueing, pushing, and sending that is less than a threshold amount of overhead and reduces latency in the detection of the events.

3. The method of claim 1, further comprising the step of the computer determining the one or more changes in the data in the database by activating a smart contract mechanism with the data that has been committed in the database, wherein the step of pushing includes reducing a consumption of computing resources.

4. The method of claim 1, further comprising the step of the computer receiving a first registration request that indicates an application being executed by a client computer is interested in the data set by making an application programming interface (API) call to specify the database, a table in the database, and a SELECT statement that identifies the data set.

5. The method of claim 1, further comprising the step of the computer receiving a registration request from an application being executed by a client computer, the registration request indicating a label to be sent to the application in response to the criteria being satisfied and the JSON transactions being prepared to be pushed to the client computer for consumption by the application.

6. The method of claim 5, further comprising the computer sending the label, a first image of a row of data in a table in the database before the data is committed, a second image of the row of data that is committed and associated with the label, and metadata about the row.

7. The method of claim 1, wherein the steps of identifying the event data, reading the records on the log record queue, setting up the grouper transaction structures, inserting the transactions indicated by the BEGTX records, removing the respective transactions that had been inserted into the open transaction array, inserting the removed transactions into the serial transaction list, restructuring the transactions in the serial transaction list, queueing the JSON transactions, pushing the JSON transactions, and sending the notification of the one or more changes are performed without a polling of the database.

8. The method of claim 1, further comprising the step of:
   providing at least one support service for at least one of creating, integrating, hosting, maintaining, and deploying computer readable program code in the computer, the program code being executed by a processor of the computer to implement the steps of identifying the event data, reading the records on the log record queue, setting up the grouper transaction structures, inserting the transactions indicated by the BEGTX records, removing the respective transactions that had been inserted into the open transaction array, inserting the removed transactions into the serial transaction list, restructuring the transactions in the serial transaction list, queueing the JSON transactions, pushing the JSON transactions, and sending the notification.

9. A computer program product for sending a notification of one or more changes in a database in a multi-client database environment, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:

the computer system identifying event data in a database satisfying criteria by a snooper thread examining a log that is updated after the event data is committed in the database, the criteria indicating one or more changes in data in the database, the examining the log including the snooper thread reading records of the log from a log buffer cache and copying the records onto a log record queue;

the computer system reading, by a grouper fan-out thread, the records on the log record queue, wherein the reading the records includes reading Begin Transaction (BEGTX) records and reading End Transaction (ENDTX) records;

the computer system setting up, by the grouper fan-out thread, grouper transaction structures for respective BEGTX records included in the log record queue read by the grouper fan-out thread;

in response to the reading the BEGTX records, the computer system inserting, by the grouper fan-out thread, transactions indicated by the BEGTX records into an open transaction array, the transactions having respective identifiers that are indexes to the open transaction array, and the open transaction array having respective offsets that point to the grouper transaction structures;

in response to the reading the ENDTX records, the computer system removing, by the grouper fan-out thread, the respective transactions that had been inserted into the open transaction array and inserting the removed transactions into a serial transaction list so that the transactions in the serial transaction list are queued in an order matching an order in which the transactions in the serial transaction list were committed;

the computer system restructuring, by a grouper evaluation thread, the transactions in the serial transaction list to respective JSON transactions which are in a JSON format the computer system queueing, by the grouper evaluation thread, the JSON transactions in respective one or more session queues of one or more client computers subscribed to a data set that specifies the event data;

the computer system pushing, by the grouper evaluation thread and using a Message Queuing Telemetry Transport messaging protocol, the JSON transactions to the one or more client computers for consumption by one or more applications being executed by the one or more client computers, respectively; and in response to the step of pushing, the computer system sending, by the grouper evaluation thread, a notification to the one or more client computers of the one or more changes to the data in the database.

10. The computer program product of claim 9, wherein the steps of identifying, reading, setting up, inserting the transactions indicated by the BEGTX records, removing, inserting the removed transactions into the serial transaction list, restructuring, queueing, pushing and sending provide a detection of events happening in the database that is passive and adds an amount of overhead to a system performing the steps of identifying, reading, setting up, inserting the transactions indicated by the BEGTX records, removing, inserting the removed transactions into the serial transaction list, restructuring, queueing, pushing, and sending that is less than a threshold amount of overhead and reduces latency in the detection of the events.

11. The computer program product of claim 9, wherein the method further comprises the step of the computer determining the one or more changes in the data in the database by activating a smart contract mechanism with the data that has been committed in the database, wherein the step of pushing includes reducing a consumption of computing resources.

12. The computer program product of claim 9, wherein the method further comprises the step of the computer receiving a first registration request that indicates an application being executed by a client computer is interested in the data set by making an application programming interface (API) call to specify the database, a table in the database, and a SELECT statement that identifies the data set.

13. The computer program product of claim 9, wherein the method further comprises the step of the computer receiving a registration request from an application being executed by a client computer, the registration request indicating a label to be sent to the application in response to the criteria being satisfied and the JSON transactions being prepared to be pushed to the client computer for consumption by the application.

14. The computer program product of claim 13, wherein the method further comprises the computer sending the label, a first image of a row of data in a table in the database before the data is committed, a second image of the row of data that is committed and associated with the label, and metadata about the row.

15. A computer system comprising:
a central processing unit (CPU);
a memory coupled to the CPU; and
a computer readable storage device coupled to the CPU, the computer readable storage device containing instructions that are executed by the CPU via the memory to implement a method of sending a notification of one or more changes in a database in a multi-client database environment, the method comprising the steps of:
the computer system identifying event data in a database satisfying criteria by a snooper thread examining a log that is updated after the event data is committed in the database, the criteria indicating one or more changes in data in the database, the examining the log including the snooper thread reading records of the log from a log buffer cache and copying the records onto a log record queue;
the computer system reading, by a grouper fan-out thread, the records on the log record queue, wherein the reading the records includes reading Begin Transaction (BEGTX) records and reading End Transaction (ENDTX) records;
the computer system setting up, by the grouper fan-out thread, grouper transaction structures for respective BEGTX records included in the log record queue read by the grouper fan-out thread;
in response to the reading the BEGTX records, the computer system inserting, by the grouper fan-out thread, transactions indicated by the BEGTX records into an open transaction array, the transactions having respective identifiers that are indexes to the open transaction array, and the open transaction array having respective offsets that point to the grouper transaction structures;
in response to the reading the ENDTX records, the computer system removing, by the grouper fan-out thread, the respective transactions that had been inserted into the open transaction array and inserting the removed transactions into a serial transaction list so that the transactions in the serial transaction list are queued in an order matching an order in which the transactions in the serial transaction list were committed;

the computer system restructuring, by a grouper evaluation thread, the transactions in the serial transaction list to respective JSON transactions which are in a JSON format the computer system queueing, by the grouper evaluation thread, the JSON transactions in respective one or more session queues of one or more client computers subscribed to a data set that specifies the event data;

the computer system pushing, by the grouper evaluation thread and using a Message Queuing Telemetry Transport messaging protocol, the JSON transactions to the one or more client computers for consumption by one or more applications being executed by the one or more client computers, respectively; and in response to the step of pushing, the computer system sending, by the grouper evaluation thread, a notification to the one or more client computers of the one or more changes to the data in the database.

16. The computer system of claim 15, wherein the steps of identifying, reading, setting up, inserting the transactions indicated by the BEGTX records, removing, inserting the removed transactions into the serial transaction list, restructuring, queueing, pushing and sending provide a detection of events happening in the database that is passive and adds an amount of overhead to a system performing the steps of identifying, reading, setting up, inserting the transactions indicated by the BEGTX records, removing, inserting the removed transactions into the serial transaction list, restructuring, queueing, pushing, and sending that is less than a threshold amount of overhead and reduces latency in the detection of the events.

17. The computer system of claim 15, wherein the method further comprises the step of the computer determining the one or more changes in the data in the database by activating a smart contract mechanism with the data that has been committed in the database, wherein the step of pushing includes reducing a consumption of computing resources.

18. The computer system of claim 15, wherein the method further comprises the step of the computer receiving a first registration request that indicates an application being executed by a client computer is interested in the data set by making an application programming interface (API) call to specify the database, a table in the database, and a SELECT statement that identifies the data set.

19. The computer system of claim 15, wherein the method further comprises the step of the computer receiving a registration request from an application being executed by a client computer, the registration request indicating a label to be sent to the application in response to the criteria being satisfied and the JSON transactions being prepared to be pushed to the client computer for consumption by the application.

20. The computer system of claim 19, wherein the method further comprises the computer sending the label, a first image of a row of data in a table in the database before the data is committed, a second image of the row of data that is committed and associated with the label, and metadata about the row.

* * * * *